Nov. 3, 1964     H. E. DE BUHR     3,155,223
BALE THROWER
Filed April 12, 1962     2 Sheets-Sheet 1
FIG. 1
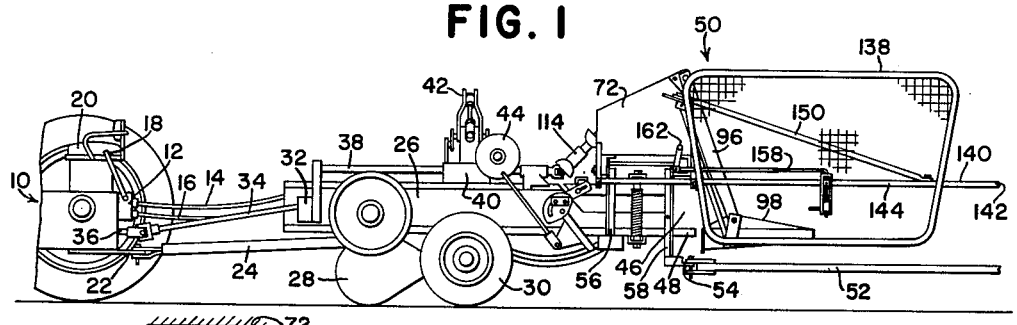
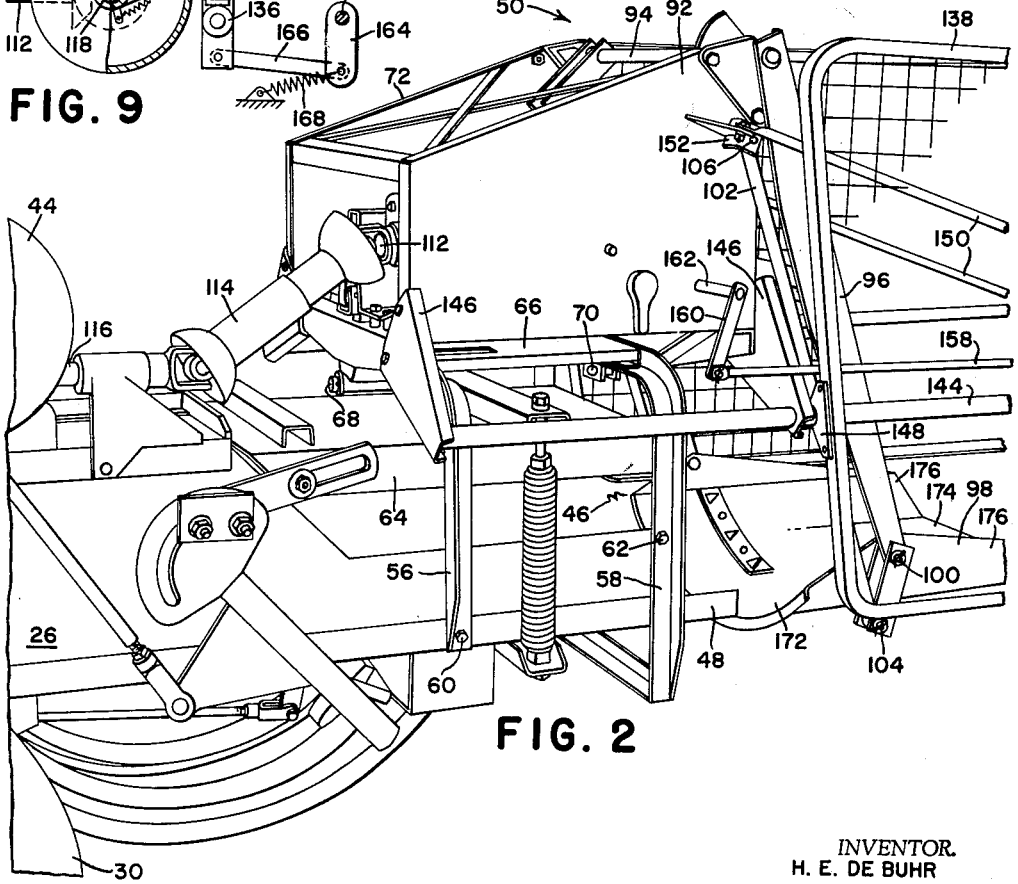
FIG. 9
FIG. 2
INVENTOR.
H. E. DE BUHR

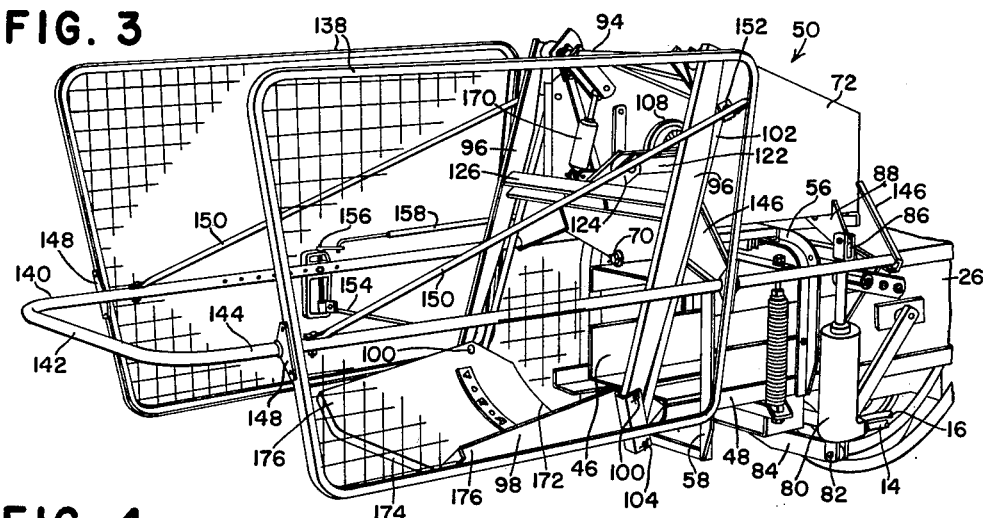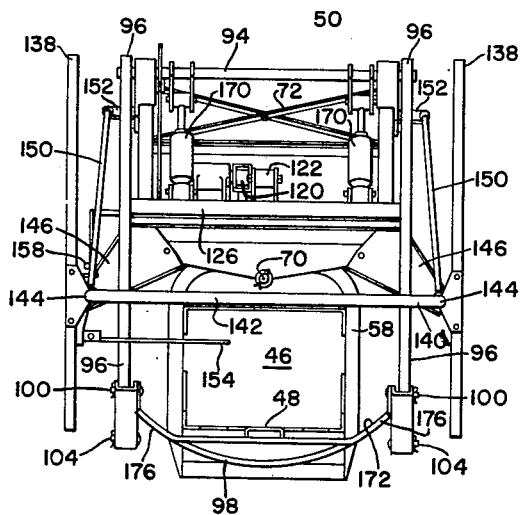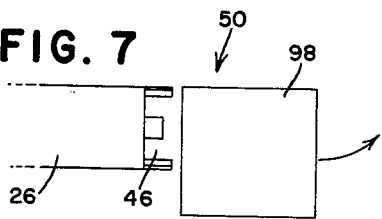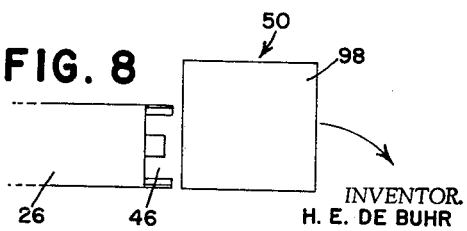

United States Patent Office 3,155,223
Patented Nov. 3, 1964

3,155,223
BALE THROWER
Harold E. de Buhr, Ottumwa, Iowa, assignor to Deere & Company, Moline, Ill., a corporation of Delaware
Filed Apr. 12, 1962, Ser. No. 186,901
7 Claims. (Cl. 198—128)

This invention relates to a bale thrower and more particularly to improvements in the mounting and control thereof.

The basic type of bale thrower in which the present invention provides improvements forms the subject matter of the U.S. patent to Morrison, 2,756,855, wherein is shown a bale thrower attached to a typical baler of the type having a fore-and-aft bale case in which bales are successively formed and delivered to the rear end of the bale case for discharge therefrom as individual bales for subsequent handling by the bale thrower, which, basically, operates to throw the bales relatively remotely from the bale case into a trailing wagon, which constitutes a considerable advance over the theretofore prior practice of delivering the bales directly to the ground and subsequently picking them up or delivering the bales up a chute and to a wagon, which still required manual handling.

In the Morrison patent just referred to, emergence of a bale to a certain point into the bale-throwing mechanism triggers a control which mobilizes actuating mechanism so that the throwing means, there in the form of a pair of arms between which the bale is gripped, are caused to swing about a transverse axis, thereby throwing the bale in an upward and rearward trajectory to the trailing wagon. Experience has shown that unless careful attention is paid to actuation of the throwing means on corners and contours, the trajectory will be such as to cause the bale to miss the wagon, which is largely the result of fore-and-aft misalinement between the baler and the wagon. This problem was solved in prior construction based on and following the Morrison patent by operator observance of the critical contour or corner situation, the control being such that it could be deactivated by the operator so that the thrower would not function in those situations. However, this required too much attention on the part of the operator and it therefore became desirable to provide some means for compensating for temporary misalinement between the baler and wagon on turns, other than deactivating the operating means, because this caused an interruption in the operative sequence and bales would pile up at the throwing mechanism.

According to the present invention, the entire throwing means is mounted on the baler for rocking about a fore-and-aft axis so that the part of the bale thrower that receives the emerging bale can, during normal operation, swing in an arc which is substantially vertical to the direction of travel and which, when corners and contours are encountered, will swing in a plane at an angle to the line of travel, thus giving the trajectory an added "curve" and insuring receipt of the thrown bale by the wagon. For example, if the baler makes a left turn, the thrower will shift to the right and vice versa. It is a further object of this invention to utilize means for selectively rocking the thrower from one side to the other from its normal position by control means within reach of the operator on the tractor that is towing the baler as equipped with the thrower. A further object is the provision of means for locking the thrower in its upright or normal condition. A further object resides in the utilization of improved frame structure for mounting and dismounting the thrower, together with improved means for providing protective guard means about the thrower so as to insure the safety of persons standing near the mechanism while it is in operation. A still further object resides in the provision of control means for the thrower actuating means, including an element mounted on the guard or protective means.

The foregoing and other important objects and desirable features inherent in and encompassed by the invention will become apparent as a preferred embodiment thereof is disclosed in detail in the ensuing description and accompanying sheets of drawings, the figures of which are described below:

FIG. 1 is a side elevational view, with portions omitted, showing a typical tractor-baler-wagon train.

FIG. 2 is an enlarged fragmentary perspective of the rear portion of the baler and a major portion of the bale-handling means as seen from one side of the machine.

FIG. 3 is a perspective, on a reduced scale, with portions omitted, of the bale-handling mechanism and the rear portion of the baler as seen from the opposite side of the machine.

FIG. 4 is a rear elevation of the structure, drawn substantially to the scale of FIG. 3.

FIG. 5 is a fragmentary enlarged view showing a locking relationship between the baler and the throwing mechanism.

FIGS. 6, 7 and 8 are schematic plan views illustrating normal, left and right positions of the thrower means, respectively.

FIG. 9 is a schematic view, partly in section and with portions omitted, showing a typical actuating means for the thrower mechanism.

In FIG. 1, the numeral 10 designates generally the rear portion of a typical agricultural tractor, which in this case has at the rear thereof a hydraulic system, such as that designated generally by the numeral 12, typical examples of which may be found in the U.S. patent to Harris, 2,871,963, or Jirsa, 2,532,552. The hydraulic system has therein a valve (not shown) which controls fluid pressure to a pair of fluid pressure lines 14 and 16 which, as is conventional in the agricultural implement art, lead to what is known as a remote cylinder, the details of which will be described below. The valve (not shown) is under control of an operating lever 18, convenient to an operator's seat 20 on the tractor.

The tractor is equipped with a drawbar of usual construction, as at 22, to which is connected the forward end of a tongue 24 of a baler which is connected in trailing relationship to the tractor. The baler, as is generally conventional, has a fore-and-aft bale case 26 to which hay or similar crops are fed by a pickup 28 as the baler is drawn over the field by the tractor, being rendered mobile by wheels 30. The mechanism by which the bales are successively formed and tied is well known to those versed in the art and therefore will be described only briefly here. For the purpose of driving this mechanism, the baler has a gear box 32 adjacent to its forward end and connected by a propeller shaft 34 to the power take-off of the tractor, as at 36. By any suitable drive means, the drive in the gear box 32 is transmitted rearwardly, as by a shaft 38 to another gear box 40 which in turn delivers to packer mechanism 42 and tying mechanism 44. It will be clear that as material is accumulated in the bale case 26 by the mechanism including a plunger (not shown) for example, control means, not shown, actuates the tying mechanism to tie the bales individually and successively with wire or twine, etc.

The rear portion of the bale case 26 terminates as an outlet 46 having a floor 48 over which the bales emerge successively rearwardly as they are formed and tied. As exemplified by the Morrison patent noted above, the bales may be delivered rearwardly to a trailing wagon by means commonly designated as a bale thrower. Such thrower is designated here in its entirety by the numeral 50. A trailing wagon (not shown) has a tongue 52 suitably connected at 54 to a trailer or wagon hitch on the rear end of the baler.

According to the present invention, the thrower as a unit is mounted on the rear portion of the bale case by means including front and rear arch members 56 and 58, the means for rigid affixation of which may include a plurality of cap screws or the like as at 60 and 62. The arch members 56 and 58 embrace the bale case from above and are so constructed that they do not interfere with the top plate 64 of the baler density control, a construction that is familiar to those versed in the art and which need not be described here except to note that the situation as respects the plate 64 and arch members 56 and 58 is one of non-interference.

The two arch members may be rigidly interconnected at their upper portions by a fore-and-aft top member 66, and below this the members are provided respectively with journals 68 and 70 which are coaxial on a fore-and-aft axis to provide pivot means for mounting a support in the form of a box-like frame 72. This frame may be made up of suitable frame members and cross braces so as to constitute a substantially rigid unit mounted on the baler via the pivots 68–70 for rocking to either side of the normal position.

FIG. 5 shows fragmentarily a construction by means of which the thrower frame 72 may be locked to the baler so that it cannot partake of the lateral rocking just referred to. Such construction would be desirable in a situation where baling is carried out largely as a straight-line operation. The locking means shown here comprises a link 74 releasably connected at opposite ends as at 76 and 78, as by bolts, between the frame 72 and the front arch member 56 which in effect establishes a connection to the baler. When one or both of the bolts 76, 78 is removed, rocking of the thrower frame 72 is available, and for this purpose hydraulic power means may be utilized, controllably connected to the tractor hydraulic power system 12. FIG. 3 shows a two-way hydraulic cylinder 80, commonly called a remote cylinder, having its lower or clevis end connected at 82 to a support 84 on the baler and having the clevis end of its piston rod detachably connected at 86 to a bracket or ear at the right hand forward portion of the thrower frame 72. The bracket 88 also appears in FIG. 5, from which it will be seen that an unused aperture therein, as at 90, is available for connection of the clevis end 86 of the piston rod of the remote cylinder 80. The cylinder is connected at its opposite ends to the remote control hydraulic hoses 14 and 16. Although these appear to lead into the same end of the cylinder 80, it will be clear to those versed in the art that the cylinder has an internal passage leading one of the hoses to the top end of the cylinder, the other hose leading of course to the bottom end of the cylinder. Hence, extension and retraction of the remote cylinder 80 is available to the operator through the medium of the control lever 18 on the tractor, whereby he may selectively rock the thrower to either side of a central or normal position about the pivot axis at 68–70.

The frame 72 includes an upper rear portion 92 above and generally in vertical alinement with the discharge outlet 46 of the bale case, and this portion carries a transverse pivot shaft 94 which rigidly mounts a pair of depending thrower arms 96, the lower ends of which terminate generally at the level of the bale case floor 48. The lower ends of the arms are pivotally connected to opposite sides of a receiver element or pan 98, the connections being made at 100, 100, and the pan being located generally at the level of the floor 48 of the outlet 46 of the bale case 26.

As will be seen, the pan 98 occupies generally a horizontal position normally in fore-and-aft alinement with the discharge outlet 46, and the horizontal position is maintained by the use of a pair of parallel links 102, one at each side of the mechanism. Each link is connected at its lower end at 104 to the pan and at its upper end at 106 to the upper rear portion 92 of the frame 72. The arrangement is such that as the arms 96 swing upwardly and rearwardly about the upper transverse pivot shaft 92, the pan 98 occupies generally a horizontal position, except that the linkage is so designed that the pan tips slightly downwardly at its rear end to facilitate throwing of the bale.

Swinging of the arms 96 and associated pan 98 about the shaft 94 as aforesaid is accomplished by power-operated actuating means comprising a one-revolution clutch, the details of which are shown in the Morrison patent, already noted. Enough of this mechanism is shown in FIG. 9 to illustrate the operation and function. The one-revolution clutch includes a constantly rotating member 108 which is bevel-gear driven at 110 from a shaft 112 which is in turn driven by a telescopic angular propeller shaft 114 from a shaft 116 which may be regarded as a continuation of the constantly driven shaft 38 on the baler. The clutch part 108 rotates about a transverse axis, established here by an intermittently rotating shaft 118, suitably journaled within the frame 72, as are all of the associated parts with the exception of propeller shaft 114. The shaft 118 terminates as a crank which is connected by a pitman 122 to a pair of ears 124 rigid on a transverse cross member 126 which in turn rigidly interconnects the arms 96. When the crankshaft turns 180°, the arms 96 are swung upwardly and rearwardly and the bale on the pan 98 departs therefrom to be received by the trailing wagon, which is a function of the acceleration that occurs when the clutch is engaged. For this purpose, the intermittently rotating shaft 118 pivotally carries a clutch dog 128 normally biased into engagement with the constantly rotating clutch part 108 but held out of engagement by a control link 130, so that a driving lug or hump 132 on the interior of clutch part 108 normally runs clear of a roller 134 on the dog 128. As will be seen, if the link 130 is swung in a counterclockwise direction, removing its roller 136 from the radially projecting end of the dog 128, the spring loading the dog will swing the dog in such direction that the roller 134 is placed directly in the path of the lug or hump 132, with the result that the clutch is engaged and the shaft 118 will be driven from the clutch part 108 to operate through the 180° cycle just referred to. Since the clutch is of the one-revolution type, the remainder of the 180° rotation of the shaft 118 will be effected, returning the arms 96 and pan 98 to the starting position, which is the position illustrated in the drawings. After the lever or link 130 is tripped, to remove its roller 136 from the dog 128, it is returned so that upon the succeeding revolution the dog again engages the roller 136 to interrupt the clutch. Hence, the thrower may be regarded as having a 360° cycle, approximately one-half of which is the throwing phase and the remainder of which is the return phase. As pointed out in the above-noted Morrison patent, engagement of the clutch 108–118 causes acceleration of the thrower via the pitman drive 122–124–126 so that as the pan reaches the end of its throwing phase, pure acceleration causes the bale to travel in an upward, rearward and then downward trajectory to be caught by the trailing wagon. The telescopic shaft at 114 accommodates rocking of the frame 72 about the pivot 68–70 without any undue interference with the drive.

Establishment of engagement of the clutch 108–118 is effected by the emergence of the bale from the bale case to the pan 98. As shown in the Morrison patent, a feeler interposed in the path of the emerging bale will trip the control mechanism when the bale has emerged to a certain extent. Substantially the same principles are utilized here, except that the control is specifically different, the details of the description of which will be postponed until further characteristics of the structure are explained.

As will be appreciated, the swinging of the mechanism

96–98 through the delivery and return phases develops substantial forces and persons working near the machine while it is in operation are apt to be injured if they move into the paths of the moving parts. For this purpose, it is desirable to substantially enclose the mechanism in protective means, here comprising a pair of guard members 138, one disposed at each side of the thrower 50, respectively in upright fore-and-aft planes. Each guard is sufficiently long as to cover the area in which the mechanism 96–98 operates. For the purpose of mounting the guards 138 there is provided a U-shaped member 140, having a transverse rear bight 142 to opposite ends of which are rigidly joined forwardly extending legs 144. Each of these legs 144 extends forwardly alongside the frame 72 and is rigidly connected thereto by a pair of brackets 146. The guards 138 are suitably connected respectively to the legs 144 by suitable connections 148 and brace members 150 extend upwardly and forwardly and are rigidly connected as at 152 respectively to opposite sides of the frame 72. Here again, the guards and U-shaped support 140 are carried entirely by the frame 72 and clear of the baler so that the whole partakes of the lateral rocking about the fore-and-aft pivot 68–70.

The clutch tripping control comprises a bale-engageable member or feeler 154 mounted on one of the legs 140 and extending transversely over the pan 98 so as to be in the path of a bale emerging from the bale case outlet 46 onto the pan. The feeler includes a vertical shaft portion 156 which is connected by a forwardly extending link 158 to an arm 160 on a transverse rockshaft 162. This rockshaft is suitably journaled by one side of the frame or support 72. Just inwardly of the right-hand wall of the support or frame 72 the rockshaft 162 may have keyed thereto an upstanding arm 164 which is linked to the previously described clutch control link 130. A spring 168 biases the linkage in a counterclockwise direction as seen in FIG. 9. This keeps the roller 136 under the clutch dog 128 unless it is moved outwardly therefrom by engagement of a bale with the feeler 154 which, in the circumstances, swings the feeler 154 rearwardly so as to draw the link 158 rearwardly, withdrawing the roller 136 on the lever or link 130 from beneath the clutch dog 128 and permitting one-revolution operation of the clutch 108–118, it being understood that once the clutch is mobilized and the throwing mechanism starts on its cycle, the bale brushes the feeler laterally clear of the near arm 96, after which the feeler returns to its starting position even though the pan is at the upper end of its cycle. The feeler may include a one-way spring-loaded connection to its shaft portion 156 so as to allow it to be moved forwardly and then to spring back to its starting position as the thrower returns to its receiving position. These details however form no part of the present invention and therefore are only briefly described.

The motion of the throwing mechanism may be snubbed, as by a pair of hydraulic shock absorbers 170.

In the operation of the mechanism, if it is found that substantially straight-line operation will be encountered, in which case there will be little if any use for rocking of the thrower 50 about the fore-and-aft axis 68–70, the thrower frame may be locked according to the structure shown in FIG. 5. In this case, and apart from other novel details, the mechanism will function substantially like that in the Morrison patent referred to above, with exceptions in the differences in construction of the pan 98 as substituted for the grippers in the Morrison patent.

When contour operation is to be expected, the lock of FIG. 5 is removed and the hydraulic cylinder or its equivalent is substituted as shown in FIG. 3. This cylinder, as already described, is under control of the operator so that by extension and retraction of the cylinder the entire thrower as a unit may be rocked laterally from one side to the other about the fore-and-aft axis 68–70. It is at this point that the special construction of the span 98 becomes effective. As best shown in FIGS. 2, 3 and 4, the forward edge of the pan (that is the edge closer to the bale discharge outlet 46) is of arcuate shape 172, and the pan is so shaped in its rearward extent that it ultimately terminates as a relatively flat portion 174, flanked at opposite sides by flared portions 176. For reasons that will be presently understood, the arcuate shape of the forward portion 172 is established substantially about the fore-and-after pivot axis 68–70 as a center (FIG. 4).

This may perhaps be best explained by examining FIGS. 6, 7 and 8. FIG. 6 shows the pan 98 in its normal or central position in which the bale case outlet 46 leads directly thereto. As will be seen in these figures, as well as in the others, the forward portion of the pan, at least, is of a width in excess of that of the outlet 46, which is for the purpose of accommodating or receiving the bale irrespective of whether the pan 98 is displaced to the left or to the right of the outlet 46 (FIGS. 7 and 8 respectively).

When the thrower is operating in its normal position, the shaft 94 may be regarded as transverse and horizontal, which means that the arms 96 will swing respectively in upright fore-and-aft planes normal to the shaft 94 and the trajectory of the thrown bale will be directly upwardly and to the rear. When the thrower is tipped to the left (FIG. 7, and regarding the bottom or pan 98 as the part referred to), the shaft 94 becomes angled to the horizontal, and the planes of operation of the arms 96 are no longer upright but are inclined outwardly and downwardly to the left. The trajectory will then include an inward or rightward curve, as suggested by the arrow in FIG. 7. Hence, if the baler is turning to the right, the wagon will become misalined to the right and the curved trajectory will cause the bale to be thrown into the wagon, conversely, when a left-hand turn is made, the pan 98 will shift to the right (FIG. 8) and the curve in the trajectory will be to the left, the positions "right" and "left" being those oriented on an observer standing behind the machine and facing forwardly. The degree of shifting of the pan 98 may be regulated by the operator, depending upon the amount of retraction or extension he puts into the cylinder 80 via the valve control lever 18 and hose lines 14 and 16. The amount of rocking will of course be limited structurally by engagement between the frame and the arch members, but these are so designed that the maximum expected rocking can be accomplished.

Features and advantages other than those categorically enumerated will readily occur to those versed in the art, as will many modifications and alterations in the preferred embodiment of the invention disclosed, all of which may be achieved without departure from the spirit and scope of the invention.

What is claimed is:

1. For a baler having a fore-and-aft bale case terminating at a rear outlet including a floor over which bales are successively discharged rearwardly: bale-handling mechanism, comprising: a support disposed above the bale case and having a rear portion above and adjacent to the bale case outlet; pivot means connecting the support to the bale case on a fore-and-aft axis above the bale case for rocking of said support from side to side, said rear portion including an upper pivot on a transverse axis at a level above the bale case outlet; bale-throwing means carried by and depending from said upper pivot for swinging rearwardly and upwardly away from the outlet for throwing a discharged bale rearwardly remote from the baler and returnable downwardly and forwardly back to said outlet to receive another bale and including a receiver element generally at the level of the bale case floor and normally alined fore and aft with the bale case outlet to receive a bale therefrom, said element being swingable laterally from side to side as the support rocks about said axis and said element having a width in excess of the bale case outlet so as to retain register with said outlet despite said lateral swinging; operating means connected between the support and the baler for selectively holding and rocking said frame; and guard means including a pair of laterally spaced members secured respectively to opposite sides of the support and extending rearwardly therefrom alongside the bale-throwing means in protective relation thereto during swinging thereof about said upper pivot.

2. The invention defined in claim 1, including: actuating means carried on the support and including a driving connection to and for swinging the bale-throwing means about said upper pivot, said actuating means being normally demobilized; and control means for mobilizing said actuating means in response to discharge of a bale to the receiver element, including a bale-engageable member carried by one of the guard members.

3. In combination with a baler having a bale-discharge portion including a pair of laterally spaced upright walls, a top and a floor defining a rear opening through which bales emerge as the baler operates, bale-handling mechanism including bale-receiving means normally positioned in alinement with said opening to receive an emerging bale; support means carrying the bale-receiving means for movement away from the opening to carry the received bale beyond said opening along a path which is generally a continuation of the line of emergence so as to deliver the bale remotely from said opening; means for operating the bale-receiving means; and means mounting the support on the baler for carrying the bale-receiving means normally in a central position in alinement with said opening to receive a bale therefrom, said mounting means including a pivot on an axis lying lengthwise of the walls and above the upper wall to enable selective rocking of the support for selectively shifting the bale-receiving means laterally to either side of said central position, said bale-receiving means including a pan-like element normally at the level of the floor to receive a bale therefrom and having a forward portion arcuate about the aforesaid axis and of a lateral width greater than that of the opening to enable receipt of a bale by said bale-receiving means when shifted laterally.

4. The invention defined in claim 3, in which: said element has a rearward portion that is substantially horizontally flat.

5. For a baler having a fore-and-aft bale case terminating at a rear outlet including a floor over which bales are successively discharged rearwardly: bale-handling mechanism, comprising: a support disposed above the bale case and having a rear portion above and adjacent to the bale case outlet; pivot means connecting the support to the bale case on a fore-and-aft axis above the bale case for rocking of said support from side to side; bale-throwing means carried by and depending from said rear portion for throwing a discharged bale rearwardly remote from the baler and including a receiver element generally at the level of the bale case floor and normally alined fore and aft with the bale case outlet to receive a bale therefrom, said element being swingable laterally from side to side as the support rocks about said axis and said element having a width in excess of the bale case outlet so as to retain register with said outlet despite said lateral swinging; force-exerting means normally connected between the support and the baler for selectively holding and rocking said frame, said force-exerting means being disconnectible between the support and bale case; and locking means in addition to said force-exerting means for locking the support against rocking when said force-exerting means is disconnected.

6. For a baler having a fore-and-aft bale case terminating at a rear outlet including a floor over which bales are successively discharged rearwardly: bale-handling mechanism, comprising: a support disposed above the bale case and having a rear portion above and adjacent to the bale case outlet; pivot means connecting the support to the bale case on a fore-and-aft axis above the bale case for rocking of said support from side to side, said rear portion including an upper pivot on a transverse axis at a level above the bale case outlet; bale-throwing means carried by and depending from said upper pivot for swinging rearwardly and upwardly away from the outlet for throwing a discharged bale rearwardly remote from the baler and returnable downwardly and forwardly back to said outlet to receive another bale and including a receiver element generally at the level of the bale case floor and normally alined fore and aft with the bale case outlet to receive a bale therefrom, said element being swingable laterally from side to side as the support rocks about said axis and said element having a width in excess of the bale case outlet so as to retain register with said outlet despite said lateral swinging; operating means connected between the support and the baler for selectively holding and rocking said frame; brackets secured respectively to and projecting laterally oppositely outwardly from opposite sides of the support; guard means disposed respectively along opposite sides of the receiver element in protective relation thereto during swinging thereof about said upper pivot; and a pair of fore-and-aft members secured respectively to the brackets and to the guard means for mounting the latter on the former.

7. The invention defined in claim 6, including: a transverse rear member cross-connecting the rear ends of the fore-and-aft members beyond the arc of swinging of the receiver element.

References Cited in the file of this patent
UNITED STATES PATENTS

| | | |
|---|---|---|
| 2,274,527 | Buran | Feb. 24, 1942 |
| 2,377,760 | Court | June 5, 1945 |
| 2,410,516 | Messenger | Nov. 5, 1946 |
| 2,756,865 | Morrison | July 31, 1956 |